Jan. 21, 1930.   F. C. BITZENBURGER   1,744,258
YIELDABLE BACK SUPPORT FOR SEATS
Original Filed Sept. 18, 1924
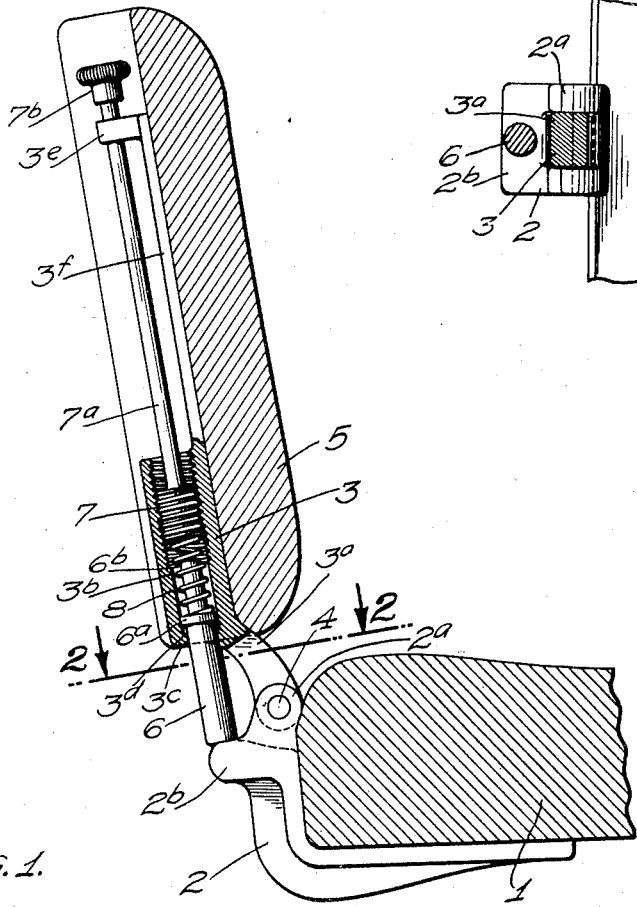
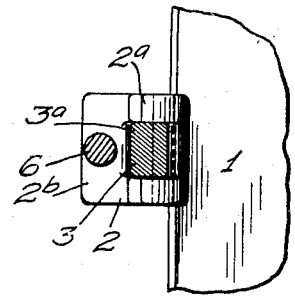
INVENTOR.
FRANK C. BITZENBURGER.
BY A. B. Bowman
ATTORNEY Patented Jan. 21, 1930

1,744,258

UNITED STATES PATENT OFFICE

FRANK C. BITZENBURGER, OF LOS ANGELES, CALIFORNIA

YIELDABLE BACK SUPPORT FOR SEATS

Original application filed September 18, 1924, Serial No. 738,439. Divided and this application filed March 26, 1928. Serial No. 264,875.

My present invention relates to yieldable back supports for seats, particularly for automobile seats, and to such seats of automobiles known as jump seats. This application is a divisional application of my previous application for yieldable back supports for seats, filed in the United States Patent Office September 18th, 1924, Serial No. 738,439.

One of the objects of this invention is to provide a very compact means for pivotally and yieldably supporting the back member of the seat relative to the seat member thereof, and in such a manner that the back member may be shifted to various back supporting positions and also forwardly against the upper side of the seat member.

Another object of my invention is to provide novel means for adjusting the back member to various positions and for varying the tension of the back member positioning spring for the various positions of the back member.

Another object of this invention is to provide novel adjusting means for the back member relative to the seat member which means is positioned at the back side of the back member so that the means are readily accessible from the seat.

A still further object of this invention is to provide means of this class which will permit of considerable variation in the position of the back member and in the yieldability thereof.

A still further object of this invention is to provide as a whole a novelly constructed means of this class, one which is simple and economical of construction, durable and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a fragmentary sectional view taken through the seat and the back member and their connecting and cooperating members, certain parts and portions being shown in elevation to facilitate the illustration, and Fig. 2 is a fragmentary sectional view thereof taken through 2—2 of Fig. 1.

Like characters of reference refer to similar parts and portions in the views of the drawings.

My seat structure, as shown in the drawings, consists essentially of a seat member 1, a supporting bracket 2, a back securing bracket 3, a pin 4, back member 5, plunger 6, screw 7, and a spring 8.

The seat member 1 is preferably of the type used in automobile jump seats and is deep and resilient. At the back side of the seat member 1 is positioned the bracket 2 which, in the present instance, is in the form of an angle bracket secured against the back side and under side of the seat member. This bracket 2 is provided with upwardly extending ears $2^a$ between which is positioned a lug $3^a$ of the back securing bracket 3, said lug being pivotally connected at its lower end, by means of the pin 4, to said ears. The main or upper portion of the bracket 3 is offset backwardly relative to the pivotal axis of said bracket and extends a considerable distance upwardly. To the front portion of the upwardly extended portion of the bracket 3 is secured the back member 5 in any suitable manner.

In the upwardly extended offset portion of the bracket 3 is provided a substantially vertical recess $3^b$, or a recess the axis of which is substantially parallel to the back member. In the lower end of this portion of the bracket is provided a hole $3^c$ which is smaller in diameter than the recess $3^b$ forming a shoulder $3^d$ at the lower end of the recess. In this recess is reciprocally mounted the one end of the seat back positioning plunger 6, the end extending into the recess being provided with a head $6^a$ which is adapted to engage the shoulder $3^d$ for limiting the outward movement thereof. The upper end of the recess or bore $3^b$ is internally threaded and receives the adjusting screw 7 which is in the form of a plug having an upwardly extending stem 7ª. Between the inner end of the screw plug 7 and the head 6ª of the plunger 6 is positioned the compression coil spring 8. The inner end of the plunger 6 is provided with a reduced pilot portion 6ᵇ around which the spring 8 is positioned. This portion is adapted to engage the inner end of the screw 7 for limiting the backward movement of the back member 5.

The outer end of the plunger 5 extends downwardly below the lower edge of the back member and engages, when the back member is in its back supporting position, a lug 2ᵇ which extends outwardly or backwardly from the seat member and backwardly from the pivotal axis of the brackets.

The stem 7ª of the adjusting screw 7 may be of any length desired but extending preferably to near the upper portion of the back member. The upper end of the stem 7ª is provided with a knob 7ᵇ for adjusting the screw as desired. It will be noted that the same may be readily reached by the occupant of the seat by turning merely a little to the side. The upper end of the stem 7ª may be supported by a lug 3ᵉ extending backwardly from a portion or leg 3ᶠ extending upwardly from the portion of the bracket 3 in which the recess is provided.

By screwing the screw 7 downwardly, the back member is shifted forwardly by the action of the spring, thus providing greater resistance to the backward shifting of the back member. It will be noted that the plunger 6, screw 7 and spring 8 are positioned in alignment and parallel with the seat member so as to take up as little space as possible.

The back member may be shifted forwardly against the upper side of the seat member when desired by merely shifting the back member forwardly. It will be noted that the seat member and the back member are sufficiently resilient so that the portions adjacent the pivotal connections thereof yield readily when the two members are placed together.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a seat back supporting means, a supporting bracket positioned at the back side of the seat, a back member securing bracket pivotally mounted at the upper portion of said supporting bracket, a plunger reciprocally mounted in said back member securing bracket, and a spring positioned in said back member securing bracket against the inner end of the plunger mounted therein, said supporting bracket having an outwardly extending lug adapted to be engaged by the outer end of said plunger for supporting said back member securing bracket in an upper position.

2. In a seat back supporting means, a supporting bracket positioned at the back side of the seat, a back member securing bracket pivotally mounted at the upper portion of said supporting bracket, a plunger reciprocally mounted in said back member securing bracket, a spring positioned in said back member securing bracket against the inner end of the plunger mounted therein, said supporting bracket having an outwardly extending lug adapted to be engaged by the outer end of said plunger for supporting said back member securing bracket in an upper position, and an adjusting screw mounted in said back member securing bracket adapted to engage said spring for compressing the same against the inner end of said plunger.

3. In a seat back supporting means, a supporting bracket positioned at the back side of the seat, a back member securing bracket pivotally mounted at the upper portion of said supporting bracket, a plunger reciprocally mounted in said back member securing bracket, a spring positioned in said back member securing bracket against the inner end of the plunger mounted therein, said supporting bracket having an outwardly extending lug adapted to be engaged by the outer end of said plunger for supporting said back member securing bracket in an upper position, and an adjusting screw mounted in said back member securing bracket adapted to engage said spring for compressing the same against the inner end of said plunger, said adjusting screw having a long upwardly extending stem secured thereto and revolubly mounted on said back member securing bracket, the upper end of said stem having an adjusting knob.

4. In a seat back supporting means, a seat, a supporting bracket positioned at the back side of the seat, a back member securing bracket pivotally mounted at the upper portion of said supporting bracket, a back member secured to said back member securing bracket adapted to be folded downwardly against the upper side of said seat, said supporting bracket having an outwardly extending lug, a plunger reciprocally mounted at one end within said back member securing bracket and extending with its other end beyond the lower side of the back member, an adjusting screw mounted in said back member securing bracket in substantial alignment with the plunger and provided with means at its upper end positioned beyond said back member securing bracket for adjusting said screw, and a compression spring positioned within said back member securing bracket between the inner end of said adjusting screw and the inner end of said plunger for yieldably supporting said back member in a back supporting position.

5. In a seat back supporting means, a seat, a supporting bracket positioned at the back side of said seat, a back member securing bracket pivotally mounted at the upper portion of said supporting bracket, a back member secured to said back member securing bracket, one of said brackets having a backwardly extending lug, a plunger reciprocally mounted with one end in the other bracket in a substantially upright position adapted to engage at its outer end said lug for supporting said back member in a back supporting position, and a spring positioned against the inner end of said plunger.

6. In a seat back supporting means, a seat, a supporting bracket positioned at the back side of said seat, a back member securing bracket pivotally mounted at the upper portion of said supporting bracket, a back member secured to said back member securing bracket, one of said brackets having a backwardly extending lug, a plunger reciprocally mounted with one end in the other bracket in a substantially upright position adapted to engage at its outer end said lug for supporting said back member in a back supporting position, a spring positioned against the inner end of said plunger, and an adjusting screw mounted in the bracket supporting the plunger and positioned against said spring for varying the tension thereof, said screw being positioned in a substantially upright position and in alignment with said spring and said plunger.

7. In a seat back supporting means, a seat, a supporting bracket positioned at the back side of said seat, a back member securing bracket pivotally mounted at the upper portion of said supporting bracket, a back member secured to said back member securing bracket, one of said brackets having a backwardly extending lug, a plunger reciprocally mounted with one end in the other bracket adapted to engage at its outer end said lug for supporting said back member in a back supporting position, a spring positioned against the inner end of said plunger, and an adjusting screw mounted in the bracket supporting the plunger and positioned against said spring for varying the tension thereof.

8. In a seat back supporting means, a seat, a supporting bracket positioned at the back side of said seat, a back member securing bracket pivotally mounted at the upper portion of said supporting bracket with the normally upper portion thereof offset backwardly from its pivotal axis, a back member secured to said back member securing bracket, said back member securing bracket having a substantially vertical recess therein from its upper side and a shoulder at the lower end of the recess, a plunger reciprocally mounted with one end therein and provided at its inner end with a head adapted to engage and to be limited by said shoulder, the other end of said plunger extending from the latter bracket and adapted to engage a portion of said supporting bracket, an adjusting screw mounted within and at the upper end of said recess, and a spring positioned in said recess between the inner end of said screw and the head of said plunger.

9. In a seat back supporting means, a seat, a supporting bracket positioned at the back side of said seat, a back member securing bracket pivotally mounted at the upper portion of said supporting bracket with the normally upper portion thereof offset backwardly from its pivotal axis, a back member secured to said back member securing bracket, said back member securing bracket having a substantially vertical recess therein from its upper side and a shoulder at the lower end of the recess, a plunger reciprocally mounted with one end therein and provided at its inner end with a head adapted to engage and to be limited by said shoulder, the other end of said plunger extending from the latter bracket and adapted to engage a portion of said supporting bracket, an adjusting screw mounted within and at the upper end of said recess, and a spring positioned in said recess between the inner end of said screw and the head of said plunger, the upper portion of said back member securing bracket having a backwardly extending lug, said screw having an upwardly extending stem revolubly mounted in said lug and provided at its upper end with means for rotating the stem.

10. In a seat back supporting means, a seat, a supporting bracket positioned at the back side of said seat, a back member securing bracket pivotally mounted at the upper portion of said supporting bracket, a back member secured to said back member securing bracket, one of said brackets having a backwardly extending portion, a stop member yieldably mounted on the other bracket and adapted to engage said backwardly extending portion, an adjusting member mounted on the latter bracket, and a spring positioned between the stop member and the adjusting member.

11. In a seat back supporting means, a seat, a supporting bracket positioned at the back side of said seat, a back member securing bracket pivotally mounted at the upper portion of said supporting bracket, a back member secured to said back member securing bracket, one of said brackets having a backwardly extending portion, a stop member yieldably mounted on the other bracket, extending partially therefrom and adapted to engage with its extended portion said backwardly extending portion, the latter bracket having a shoulder adapted to limit the extension of the stop member from the latter bracket, an adjusting member mounted on the latter bracket, and a spring positioned between the stop member and the adjusting member.

In testimony whereof, I have hereunto set my hand at Los Angeles, California this 20th day of March 1928.

FRANK C. BITZENBURGER.